TELEPHONE CALL INDICATOR

Filed April 16, 1954

2 Sheets-Sheet 1

INVENTOR.
Jacob Rabinow
BY
Max L. Libman
Attorney

Nov. 12, 1957 J. RABINOW 2,813,154

TELEPHONE CALL INDICATOR

Filed April 16, 1954 2 Sheets-Sheet 2

INVENTOR.
Jacob Rabinow
BY
Max L. Libman
Attorney 2,813,154

TELEPHONE CALL INDICATOR

Jacob Rabinow, Takoma Park, Md.

Application April 16, 1954, Serial No. 423,612
5 Claims. (Cl. 179—84)

This invention relates to a call indicator for telephones, and has for its primary object the provision of a simple, reliable, and inexpensive indicator which will provide a visual signal to indicate that a telephone has been rung.

The use of telephone answering services is rapidly growing. Such services answer the subscriber's telephone when it rings during his absence. When the subscriber returns, he must call the answering service to ascertain whether there have been any calls for him and to receive any messages which may have been left. In a typical situation, it will turn out, more often than not, that there has been no call; however, the subscriber must call the answering service to find out whether or not any calls to him have been made. The primary object of my invention is to provide a simple and inexpensive visual signal device which will indicate to the subscriber whether his telephone has rung during his absence. The signal may be in the form of a light, or it may be in the form of a mechanical pointer or indicator which by its position shows whether it has been actuated. When the subscriber leaves the place where the telephone is located, for example, his place of business, it is only necessary for him to ascertain that the signal has been reset to no indication so that upon his return the condition of the signal will indicate whether there have been any calls. If the signal device is unactuated on his return, he is saved the trouble and expense of making an unnecessary call to the answering service to find out whether there have been any messages for him. Furthermore, the answering service is saved the trouble of informing him that there is no call for him.

The above suggested use is, of course, primarily in connection with business telephones. However, it is also useful in connection with a home telephone for the subscriber to know whether there have been any calls in his absence. Furthermore, by making the signal device a lamp which also provides some illumination in the vicinity of the telephone, the device is very useful in connection with night calls, since it both shows the location of the telephone, and where the 'phone is located in a bedroom, renders it unnecessary to put on any additional lights and thereby awake other persons in the room.

It is, of course, possible to make a device of the kind described above by the use of expensive electronic equipment. Such arrangements are known in connection with expensive and complex telephone answering devices. However, the cost of such devices is so high as to greatly limit the market for the device. It is therefore important to provide an extremely inexpensive device for the purpose. Another consideration is the reluctance of the telephone company to permit any equipment to be used in connection with the telephone which in any way interferes with or affects the normal operation of the telephone. It is therefore an important object of the invention to provide a telephone call signal which requires no physical support or electrical connection to the telephone but is operated entirely by the mechanical vibrations of the telephone bell. In fact, the device need not be in physical contact with the telephone, since it may be actuated entirely by sound vibrations of the bell, although for practical reasons it is usually preferable to construct the device as a base for the telephone on which the telephone may be placed but not fastened; in this case, the device may be actuated primarily by mechanical vibrations from the telephone transmitted directly to the base.

One difficulty which arises in connection with a device of the type described, which is sensitive to mechanical vibrations, is that it will tend to be actuated by any mechanical vibration such as that caused by jarring the table or desk on which the telephone stands, or even by mechanical jarring of the floor of the room. It is a further object of my invention to provide a means for rendering the device insensitive to such mechanical vibration or jarring, while making it sensitive to any normal ringing of the telephone bell. This important object of the invention is accomplished by providing a time-delay in the system, whereby it will respond only to relatively prolonged vibration in the order, for example, of one second, but will not respond to vibrations or jarring of shorter duration.

Other objects are to provide a device of the type described which is reliable in operation, simple and rugged in construction, stable in operation so that it requires no maintenance or adjustments during normal use, and very inexpensive to construct, with a minimum of moving parts or expensive electronic equipment.

The specific nature of the invention, as well as other objects and advantages thereof, will clearly appear from a description of a preferred embodiment as shown in the accompanying drawing, in which.

Figures 1, 2:
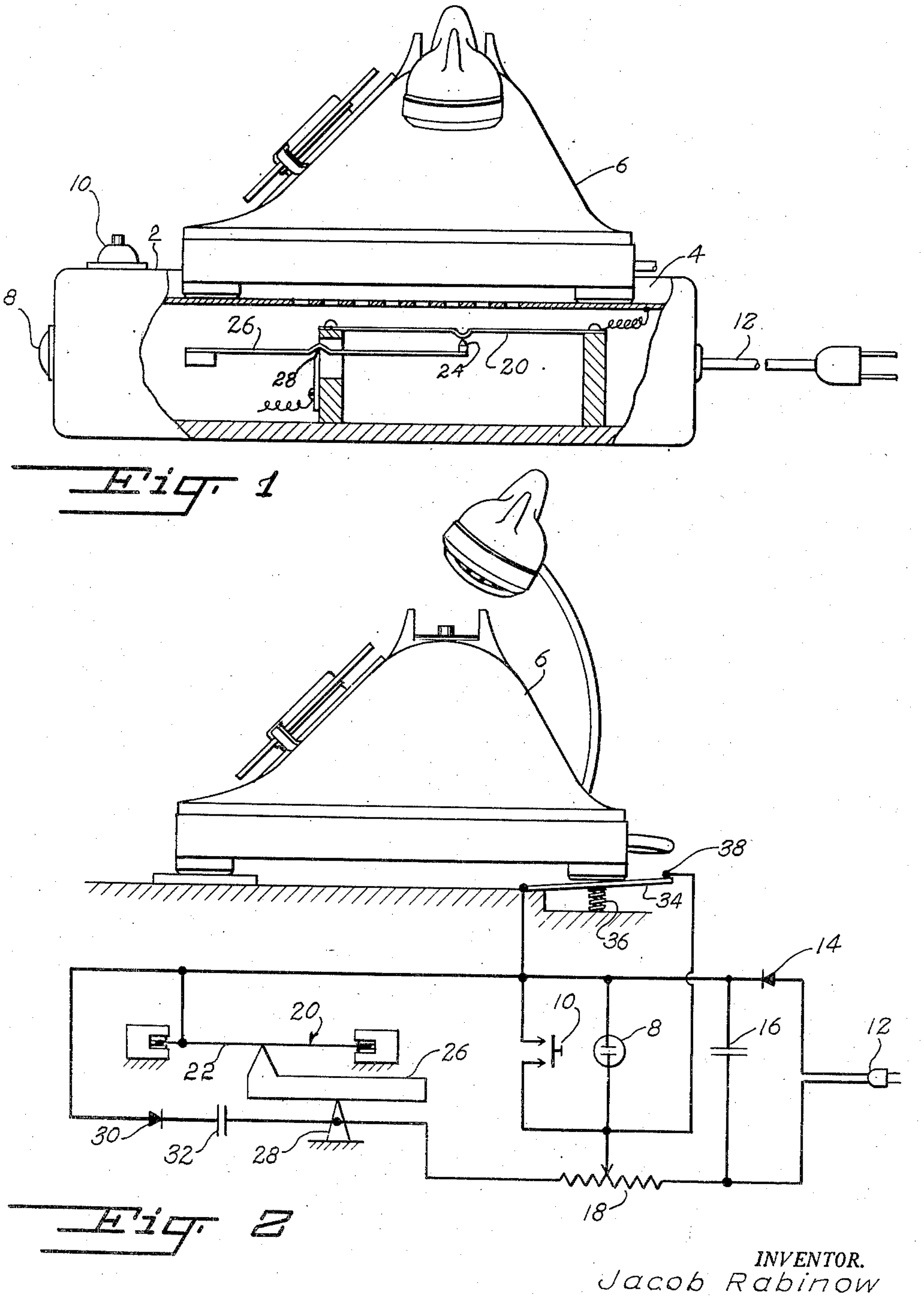
Fig. 1 is a side view of the invention embodied in a stand or base for a telephone hand set.
Fig. 2 is a schematic circuit diagram of one form of the invention.

The physical arrangement of a practical embodiment of the invention is shown in Fig. 1 in which the invention is housed in a base or casing 2 having a recess 4 of a size to accommodate the base of a conventional dial type telephone set. Mounted in the front of the case 2 is a signal lamp 8 which may be a small neon glow lamp. Suitably located on the top of the case is a push button type switch 10 which may be depressed momentarily to reset signal lamp 8 when it is in the lighted condition. A conventional cord and plug 12 is shown for supplying power to the circuit.

A typical circuit arrangement for use in the casing of Fig. 1 is shown in Fig. 2. The circuit runs from the upper side of plug 12, which is plugged into any conventional 110 volt alternating current outlet, through a rectifier 14 and condenser 16 back to plug 12. Condenser 16 is shunted by the series arrangement of part of potentiometer 18 and vibration-responsive switch 20; and neon lamp 8 is connected as shown between one side of the condenser circuit and a suitable point of potentiometer 18. Potentiometer 18 is so adjusted that the voltage across lamp 8 is sufficient to maintain a glow discharge in the lamp once such discharge is initiated, but is of insufficient value to originally originate such a discharge. This takes advantage of the well known characteristic of such lamps which require a much higher voltage to initially energize or "strike" them than to maintain such a discharge. The value of the potentiometer resistance is such that when the diaphragm switch 20 is opened, the neon lamp 8 is no longer shunted by the switch and part of potentiometer resistance 18, so that the full value of the voltage across the condenser is now applied to the neon lamp, whereupon the lamp immediately "strikes" producing a visible glow discharge, which will now be maintained even though the diaphragm switch is immediately reclosed. Thus it will be seen that even an instantaneous opening of the diaphragm switch, for example, in the order of a millisecond, will cause the neon lamp to glow, and it will remain in this glowing condition thereafter. Vibration responsive switch 20 comprises essentially a thin vibratory diaphragm 22 against the center of which a contact point 24 of lightly balanced contact arm 26 rests. Contact arm 26 is relatively massive and balances on knife edge 28 so that it presses very lightly against diaphragm 22. It will be apparent that the slightest vibration of the diaphragm will open the circuit between it and point 24, since the massive contact arm 26 cannot follow the rapid motions of diaphragm 22. Furthermore, as the diaphragm vibrates in both directions, in its motion toward contact point 24 it will cause balance arm 26 to begin a relatively slow oscillation away from the contact point, whereby the circuit will remain open for an appreciable length of time. In practice, the arrangement so far described was found to be much too sensitive in that a single jar or vibration through the table on which the device rests or even from the floor of the room would cause the circuit to break and the glow lamp to ignite, thus giving a false signal. This is prevented by providing across the diaphragm switch 20 a time delay circuit consisting of additional rectifier 30 and condenser 32. Now when the diaphragm switch 20 opens, the voltage across neon lamp 8 does not immediately rise to the striking value due to the initial rush of current to charge condenser 32. The time constant of the delay circuit is, of course, determined by the value of condenser 32 and the included portion of potentiometer resistance 18. However, if the vibrations are sustained for a sufficient length of time, switch 20 opens a sufficient number of times so that finally condenser 32 is fully charged and thereafter full striking voltage appears across lamp 8, which, once it is ignited, remains in the visible glowing condition until push-button switch 10 is momentarily closed to reset the circuit to its initial non-glowing condition. In practice, the device can be easily set so that a sustained bell ringing vibration of approximately one second is required to cause the glow lamp 8 to light.

Push button 10, when depressed, shorts the neon lamp 8 and discharges condenser 16 through the included portion of potentiometer 16 to reestablish the initial dark condition of the lamp even after the push button is released. A momentary touch of the button therefore resets the circuit.

An additional optional automatic resetting switch 34 may be provided. This switch is biased by spring 36 toward closing position in which it engages contact 38 to short out the neon lamp 8. The force of spring 36 is such that the weight of the telephone 6 without its handset 7 is not sufficient to overcome the spring force to open switch 34, but the additional weight of the handset (about one pound) causes the switch to open. Thus normally, (when the handset is in its cradle) switch 34 is open and the system operates as described. However, when the 'phone has rung and lamp 8 in consequence has lighted, the next time the 'phone is used to inquire about the call which produced the signal, or in answer to the ring (if the user is present when the ring occurs), switch 34 will close when the handset is lifted from its cradle and the signal lamp will automatically be reset. The automatic switch may, of course, be used in lieu of or in addition to manual push button 10.

It will be seen that the above described device fulfills the objects of the invention. It uses a negligible amount of current; it requires no expensive electronic components; it is simple and effective in operation. It can, of course, be set off by any sustained sound vibration, but since the bell is located immediately above the diaphragm, it can be readily so constructed that even loud sustained sounds in the room will not effect it, while any ordinary ringing of the bell will readily actuate the lamp. The diaphragm may be of very simple construction; in fact, the top of a tin can of about three inches diameter has served very satisfactorily for this purpose. The balance arm must, of course, be adjusted so that it is very nearly in equilibrium with only a slight residual pressure against the center of the diaphragm. It is obvious that the proportions and positions of these parts may be widely varied, it being only necessary to have a relatively massive oscillating contact member resting lightly against a flexible diaphragm member capable of vibrating in response to sound.

Figure 3:
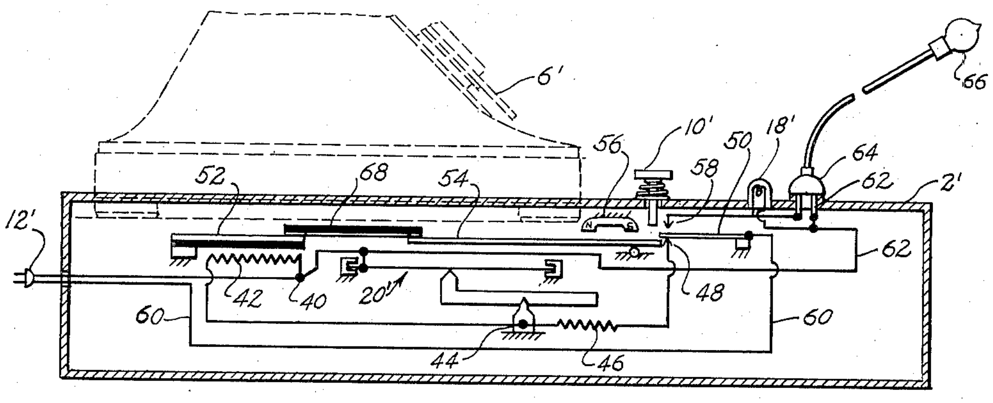
Fig. 3 is a cross-sectional view and schematic circuit diagram of a preferred form of the invention.

Fig. 3 shows a still further simplified version of the invention. In this form, casing 2' is constructed to serve as a base for telephone 6', as before. Vibration-actuating diaphragm 20' may be of the same construction as in Fig. 1, and is preferably located immediately underneath the bottom of the telephone. Power is supplied from any suitable source by means of plug 12', the circuit running from one side of the power source to point 40, where it branches on the one hand through heating coil or resistor 42 to one side 44 of the vibration switch 20'; and on the other hand, from junction point 40 through the diaphragm of the vibration switch to point 44. It will thus be seen that the vibration switch normally shunts the heating coil and prevents the flow of current through the coil. From point 44 the circuit continues through current limiting resistor 46, normally closed contact 48 and switch arm 50 back to the other side of the supply circuit. When the vibration switch 20' is agitated by the ringing of the telephone bell, the contacts bounce apart as before, and the circuit is open most of the time while the ringing continues. During the time the contacts are separated, current will obviously flow through heating coil 42, the temperature of which will therefore rise. This causes bimetallic strip 52 to bend in an upwardly direction, carrying with it switch actuating arm of magnetic material. Just before switch actuating arm 54 comes in contact with switch arm 50, it comes into the field of influence of permanent magnet 56 and is immediately drawn up toward the magnet. This causes a quick opening of the circuit at contact 48 and a closing of the circuit at contact 58. The thermal switch circuit is now opened and current flows through conductor 60, switch arm 50, contact 58, signal lamp 8', conductor 62 back to the plug 12'. The lamp is thus energized and remains energized even after the bell ringing has ceased due to the attraction of magnet 56 for actuator arm 54. An additional outlet 62 may be provided for a plug 64 which may be used to light any suitable table or other lamp 66 to furnish illumination in the vicinity of the telephone, if desired. As the circuit through heating resistor 42 has been broken, bimetallic element 52 will immediately cool down and actuator arm 52 will tend to return to its original position. However, due to the action of magnet 56, it cannot do so until plunger 10' is manually depressed to return the contacts to their original position. The system is now again reset for signal operation.

Figure 4:
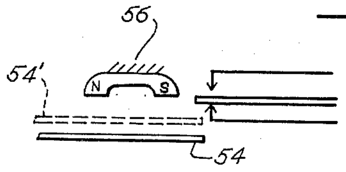
Fig. 4 is a detail view of the contact-making element of Fig. 3 in the normal, unactuated position.

In practice, the motion required of switch arm 50 may be very small, in the order of a few hundredths of an inch. In Fig. 4, actuator arm 54 is shown in its original position and in dotted lines at 54', just before it enters the field of attraction of the magnet 56. It will thus be seen that a positive snap action is provided, ensuring clean operation of the switch contacts.

Figure 5:
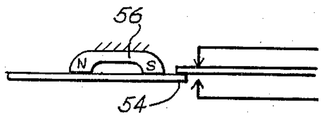
Fig. 5 is a view of the same element in actuated position.

Fig. 5 shows the switch arm in the signalling position. Between bimetallic element 52 and actuator arm 54 a second oppositely biased thermostatic element 68 is placed in order to compensate for normal ambient temperature variations. As the ambient temperature rises and falls, bimetallic elements 52 and 68 will tend to bend oppositely so as to leave arm 54 in its original position. However, energization of heating coil 42 will affect thermostatic element 52 to cause the operation previously described.

Figure 6:
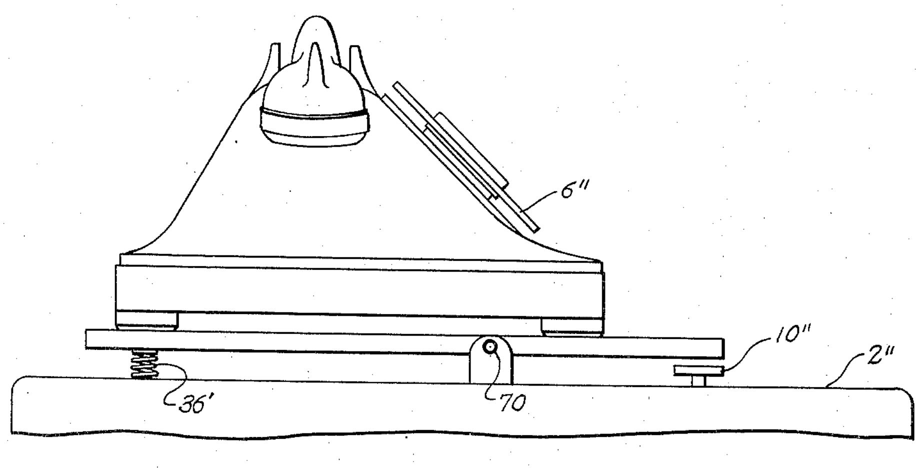
Fig. 6 shows an automatic resetting device for the modification of Fig. 3.

Fig. 6 shows an automatic resetting arrangement for the modification of Fig. 3. The telephone 6″ now rests on a platform 72 hinged at 70 for limited rocking motion. A spring 36′ at the rear end has sufficient force, as in Fig. 2, to overcome the weight of the telephone without the handset, and to depress button 10″ to reset the signal. When the handset is replaced, its weight overcomes the spring 36″ and rocks platform 72 back into the position shown, releasing button 10″ into its original position. Thus, to reset the signal the handset need only be lifted and replaced.

It will be noted that while the signal lamp in each modification is shown normally off and is lighted to indicate that the bell has rung, this can be reversed, and the signal lamp may be normally on and extinguished to indicate that the bell has rung; similarly, the respective components of the combination which are normally energized may be operated in reverse, that is, normally deenergized.

It will be apparent that the embodiments shown are only exemplary and that various modifications can be made in construction and arrangement within the scope of my invention as defined in the appended claims.

I claim:

1. A visual indicator for use with a bell-ringing device comprising a vibration-actuated switch operable when the switch is subjected to vibration from said bell-ringing device, a visual signal device actuated by operation of said switch, and time-delay means for preventing actuation of said signal device until said vibration is sustained for a predetermined definite interval, said visual signal device being a gas-filled glow tube having a definite striking voltage and a lower extinguishing voltage, means normally biasing said tube above its extinguishing voltage but below its striking voltage, and means for applying sufficient additional voltage to said tube to cause it to strike, said last means being controlled by said vibration-actuated switch.

2. The invention according to claim 1, said time-delay means comprising a resistance-capacitance circuit for delaying the buildup of a striking voltage across said lamp.

3. The invention according to claim 1, and additional switch means for extinguishing said lamp to reset the indicator to its normal unactivated condition.

4. The invention according to claim 3, in combination with a telephone having a cradle and a handset, said additional switch means including weight-responsive switch actuating means adjusted to the weight of the telephone handset for operating said switch to extinguish said signal when the handset is lifted from the cradle, at least a portion of said telephone being supported by said switch actuating means.

5. A visual indicator for use with a bell-ringing device comprising a vibration-actuated switch operable when the switch is subjected to vibration from said bell-ringing device, a visual signal device actuated by operation of said switch, said visual signal device being a gas-filled glow tube having a definite striking voltage and a lower extinguishing voltage, means normally biasing said tube above its extinguishing voltage but below its striking voltage, and means for applying sufficient additional voltage to said tube to cause it to strike, said last means being controlled by said vibration-actuated switch.

References Cited in the file of this patent

UNITED STATES PATENTS

| | | |
|---|---|---|
| 1,966,184 | O'Neill | July 10, 1934 |
| 2,506,279 | Rowe | May 2, 1950 |
| 2,549,548 | Von Zimmerman | Apr. 17, 1951 |
| 2,562,069 | Stein et al. | July 24, 1951 |
| 2,572,815 | LaPorte | Oct. 23, 1951 |
| 2,616,972 | McNutt | Nov. 4, 1952 |